(12) United States Patent
Cismas et al.

(10) Patent No.: US 10,270,840 B2
(45) Date of Patent: Apr. 23, 2019

(54) MODULAR SYSTEM FOR HOLISTIC DATA TRANSMISSION ACROSS AN ENTERPRISE

(71) Applicant: BANK OF AMERICA CORPORATION, Charlotte, NC (US)

(72) Inventors: Sorin N. Cismas, Addison, TX (US); Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 805 days.

(21) Appl. No.: 14/588,421

(22) Filed: Jan. 1, 2015

(65) Prior Publication Data

US 2016/0197979 A1 Jul. 7, 2016

(51) Int. Cl.
H04L 29/08 (2006.01)

(52) U.S. Cl.
CPC .................... H04L 67/10 (2013.01)

(58) Field of Classification Search
CPC ........................................ H04L 67/10
USPC ................................. 709/217–219
See application file for complete search history.

(56) References Cited

U.S. PATENT DOCUMENTS

| | | | |
|---|---|---|---|
| 6,073,109 A | 6/2000 | Flores et al. | |
| 6,397,192 B1 | 5/2002 | Notani et al. | |
| 7,451,432 B2 | 11/2008 | Shukla et al. | |
| 7,512,708 B2 * | 3/2009 | Read | H04L 29/06027 709/245 |
| 8,335,773 B2 | 12/2012 | Balko et al. | |
| 8,782,201 B2 | 7/2014 | Kephart et al. | |
| 8,799,174 B1 | 8/2014 | Mitchell et al. | |
| 9,258,765 B1 * | 2/2016 | daCosta | H04W 84/18 |
| 2003/0018700 A1 * | 1/2003 | Giroti | H04L 12/6418 709/201 |
| 2004/0210607 A1 | 10/2004 | Manchanda et al. | |
| 2006/0010195 A1 * | 1/2006 | Mamou | G06Q 10/10 709/203 |
| 2006/0069717 A1 * | 3/2006 | Mamou | G06F 17/30563 709/203 |
| 2007/0100892 A1 | 5/2007 | Kephart et al. | |

(Continued)

OTHER PUBLICATIONS

Mueller, Robert, Ulrike Greiner, and Erhard Rahm. "Agentwork: a workflow system supporting rule-based workflow adaptation." Data & Knowledge Engineering 51.2 (2004): 223-256.

(Continued)

*Primary Examiner* — Minh Chau Nguyen
(74) *Attorney, Agent, or Firm* — Michael A. Springs; Moore & Van Allen PLLC; James C. Edwards

(57) ABSTRACT

A technology/operating system-agnostic and protocol-agnostic service delivery system that includes a unified means data movement/transfer. By unifying the delivery of such services the need to deploy numerous different technology/OS-specific and/or protocol-specific applications/services conventionally used to provide such services is obviated. The unified nature of the system, not only provides for comprehensive delivery of services, such as data movement amongst all the servers in the enterprise's network but also provides for unified management of the services delivered, such as governance control over the services, unified tracking of services delivered, unified provisioning of updates/revisions to modules, and auditing processes for services delivered.

10 Claims, 3 Drawing Sheets

(56) References Cited

U.S. PATENT DOCUMENTS

| | | | |
|---|---|---|---|
| 2009/0063665 A1* | 3/2009 | Bagepalli | H04L 63/166 709/222 |
| 2009/0125366 A1 | 5/2009 | Chakraborty et al. | |
| 2009/0276771 A1* | 11/2009 | Nickolov | G06F 9/4856 717/177 |
| 2010/0153153 A1 | 6/2010 | Balko et al. | |
| 2011/0276699 A1* | 11/2011 | Pedersen | H04L 45/24 709/227 |
| 2012/0014266 A1* | 1/2012 | Diaz | H04L 41/12 370/252 |
| 2013/0104236 A1* | 4/2013 | Ray | H04L 63/1433 726/25 |
| 2013/0158964 A1 | 6/2013 | Hall et al. | |
| 2013/0332001 A1* | 12/2013 | Parello | G06F 1/3209 700/295 |
| 2014/0025426 A1 | 1/2014 | Doehring et al. | |
| 2014/0201747 A1 | 7/2014 | Suman et al. | |
| 2015/0188949 A1* | 7/2015 | Mahaffey | H04L 63/20 726/1 |

OTHER PUBLICATIONS

Reichert, Manfred, Thomas Bauer, and Peter Dadam. "Enterprise-wide and cross-enterprise workflow management: Challenges and research issues for adaptive workflows." (1999):56-64.

Lee, Kevin, et al. "Adaptive workflow processing and execution in pegasus." Concurrency and Computation: Practice and Experience 21.16 (2009): 1965-1981.

* cited by examiner

MODULAR SYSTEM FOR HOLISTIC DATA TRANSMISSION ACROSS AN ENTERPRISE

FIELD

In general, embodiments of the invention relate to network data communication and, more particularly, a self-service technology-agnostic and protocol-agnostic data movement and management system implemented across all servers within an enterprise.

BACKGROUND

In large enterprise businesses, different software systems (otherwise referred to as applications, modules and the like) are deployed for the purpose of carrying out prescribed actions. For example, an enterprise may deploy one or more software systems to monitor the health of the computing system, one or more other software systems to move data throughout the enterprise and one or more other software systems for messaging. All of these software systems are stacked on the servers within the enterprise to carry out the request functionality. Each of these software systems are generally independent of each other; i.e., different commercial manufacturers and/or execute under different operating systems. As such, these diverse software systems require a high degree Information Technology (IT) support and maintenance to ensure that the systems are capable of working in unison. Additionally, each of these independent software systems implement distinct tracking controls and governance, which further increase maintenance costs.

Additionally, software systems that are deployed for the purpose of moving data (i.e., transferring data files, conducting transactions and the like) are not only specific as to Operating Systems (OSs) and manufactures, but also require that the user have access/entitlement at the server-level. Such access entitlement at the server-level is problematic from a data movement standpoint as well as a security standpoint. From the data movement standpoint the user can only transfer data from servers to which the user has been granted access/entitlement. From the security standpoint, once the user is granted access to a server, the user is not typically limited in terms of actions on that server and, as such, may move, or even delete, any data files stored on the entitled server (even though such data files were not the basis for granting the user access/entitlement.

Therefore, a need exists to develop systems, apparatus, computer program products, methods and the like that for a unified and comprehensive software deployment system that is extensible and provides one methodology for accessing Operating Systems (OSs) and all of the servers deployed throughout an enterprise. In this regard, the desired system should provide a holistic and enterprise-wide solution for data movement (i.e., transferring data from one enterprise server to another enterprise server, conducting transactions between servers and the like). Moreover, the unified nature of the desired system should allow for centralized control of tracking the movement of data, governance over the movement of data, audit procedures and the like. In addition, the desired system should provide requisite granularity so as to control data movement at the file level.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for a technology-agnostic and protocol-agnostic system for delivering services including data movement/transfer within an enterprise. The embodiments herein described provide for a modular system that is easy and cost-effective to deploy and is extensible, such that as new services are warranted, additional modules can readily be added to the system. The technology/OS-agnostic nature of the system means that any server, regardless of manufacturer or OS, can be assimilated into the system for the purpose of sending and/or receiving data. Moreover, the protocol-agnostic aspect of the system means that data can be transferred/communicated using any known, or future known, protocol (without requiring a separate application specific to the desired protocol).

In addition, the system herein described provides for a comprehensive and unified approach to data movement/transfer within an enterprise. As such, the integrated system, in addition to providing for data movement transmissions/transactions, also provides for unified governance control over the movement of data, unified tracking of data movement across the enterprise, unified auditing processes, granularity of control at the file level and the like.

In additional embodiments of the invention the service delivery application provides for a messaging module that is configured for protocol-agnostic message queuing/brokering. Moreover, in further embodiments of the invention the service delivery application includes a web services module that is configured for providing legacy application that are devoid of web services, with requisite web services capability, including a web browser.

An apparatus for uniform delivery and management of services within an enterprise defines first embodiments of the invention. The apparatus includes a computing platform having a memory and at least one processor in communication with the memory. The apparatus further includes an operating system-agnostic, modular-based, service delivery application stored in the memory and executable by the processor. The service delivery application includes a data transfer module configured to provide protocol-agnostic data connections between a plurality of servers in the enterprise for the purpose of transferring data from one end point to another (e.g., server-to-server, application-to-application or the like). The service delivery application is further configured to provide for uniform management of security, governance, auditing, reporting and provisioning of the modules included in the service delivery application.

In further specific embodiments of the apparatus, the service delivery application further includes a messaging module configured to provide protocol-agnostic message brokering.

In other specific embodiments of the apparatus, the service delivery application includes a web services module configured to provide legacy applications with web services capabilities, such as web browser or the like.

In still further specific embodiments of the apparatus, the service delivery application includes a data archiving module configured to provide protocol-agnostic data archiving.

Additionally, in further embodiments of the apparatus, the service delivery application is further configured to provide uniform management of security, governance, auditing, reporting and provisioning of the modules included in the service delivery application by presenting single Graphical User Interface (GUI) views that allow the user to manage security, governance, auditing, reporting and provisioning of the modules.

Moreover, in other specific embodiments of the apparatus, the data transfer module is further configured to provide a protocol for a data connection between servers in the enterprise. In related embodiments of the apparatus, the data transfer module is further configured to provide data transfer entitlements at a server-level. In such embodiments of the apparatus, the entitlements may be based on a server rating system, which is used to determine if servers are approved to communicate with one another (i.e., transfer data). In such embodiments of the apparatus, the server rating system may be based at least on (1) type of data being transferred and (2) geographic location of the server.

Another apparatus for uniform delivery and management of services within an enterprise defines second embodiments of the invention. The apparatus includes a computing platform having a memory and at least one processor in communication with the memory. Additionally, the apparatus includes an operating system-agnostic, modular-based, service delivery application that is stored in the memory and executable by the processor. The service delivery application includes a data transfer module configured to provide protocol-agnostic data connections between a plurality of servers in the enterprise for the purpose of data transfer/transactions. The application additionally includes a messaging module configured to provide protocol-agnostic message brokering and a web services module configured to provide legacy applications with web services capabilities, such as a web browser and the like. The service delivery application is further configured to provide for uniform management of security, governance, auditing, reporting and provisioning of the modules included in the service delivery application. In specific embodiments of the apparatus. The service delivery application is configured to provide uniform management of security, governance, auditing, reporting and provisioning of the modules included in the service delivery application by presenting single Graphical User Interface (GUI) views that allow the user to manage security, governance, auditing, reporting and provisioning of the modules.

In further specific embodiments of the apparatus, the data transfer is further configured to provide or retrieve a protocol for a data connection between servers in the enterprise based, at least in part, on the servers that will be transferring and receiving the data that will be transferred/moved. In further related embodiments of the apparatus, the data transfer module is further configured to provide data transfer entitlements at a server-level, such that any user authorized to use the application can transfer data as long as the servers are entitled to communicate with one another. In specific embodiments of the application, the data transfer module is further configured to implement a server rating system to determine if servers are approved for data transfer. In such embodiments of the apparatus, the server rating system may based at least on (1) type of data being transferred (i.e., the type of data that a server is qualified to receive and/or send), and (2) geographic location of the server.

A computer program product including a non-transitory computer-readable medium defines third embodiments of the invention. The computer-readable medium includes a first set of codes for causing a computer to provide protocol-agnostic data connections between a plurality of servers in an enterprise computing network. Additionally, the computer-readable medium includes a second set of codes for causing the computer to provide protocol-agnostic message brokering and a third set of codes for causing the computer to provide legacy applications with web services capabilities and a web browser. In addition, the computer-readable medium includes a fourth set of codes for causing the computer to provide uniform management of security, governance, auditing, reporting and provisioning of the data connections, the message brokering and the web services capabilities.

Thus, systems, apparatus, methods, and computer program products herein described in detail below provide for a technology-agnostic and protocol-agnostic means for providing services within an enterprise including data transfer/movement. The embodiments herein described below in detail, thus serve to obviate the need to deploy numerous different technology/OS-specific and/or protocol-specific applications/services conventionally used to move data, conduct transactions, messaging, web services or the like. The unified nature of the system not only provides for comprehensive services, such as data movement but also provides for unified governance control over the services, unified tracking of data movement across the enterprise, unified auditing processes for the services and the like.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
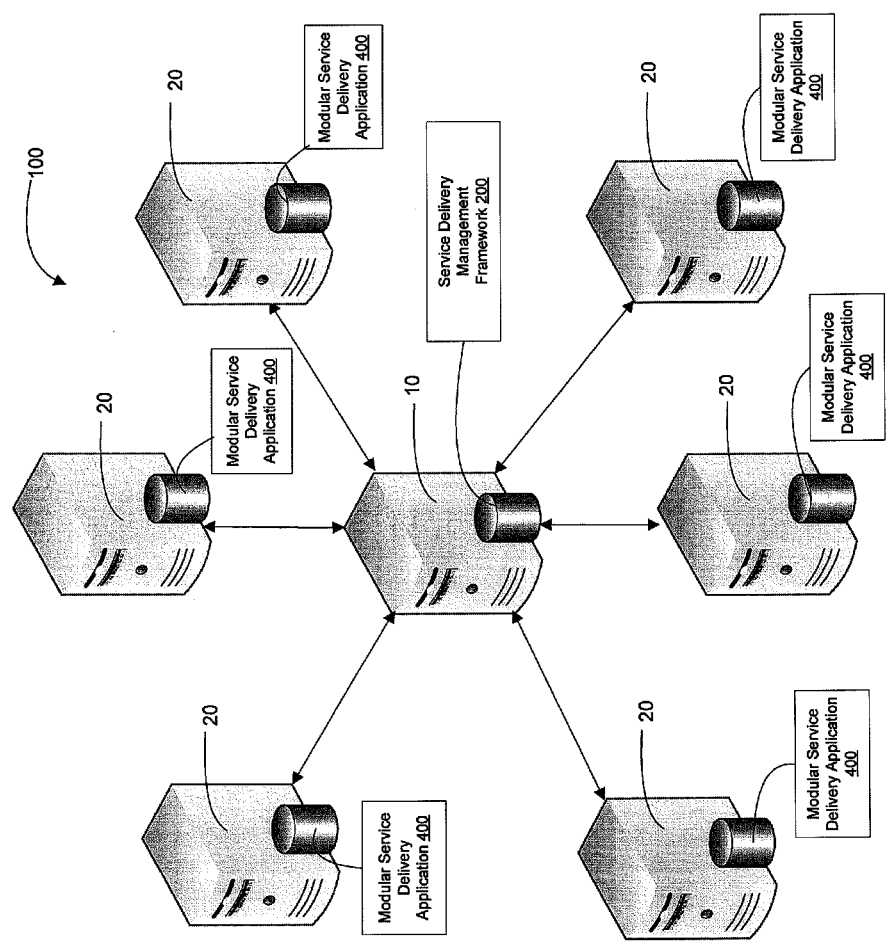
Figure 2:
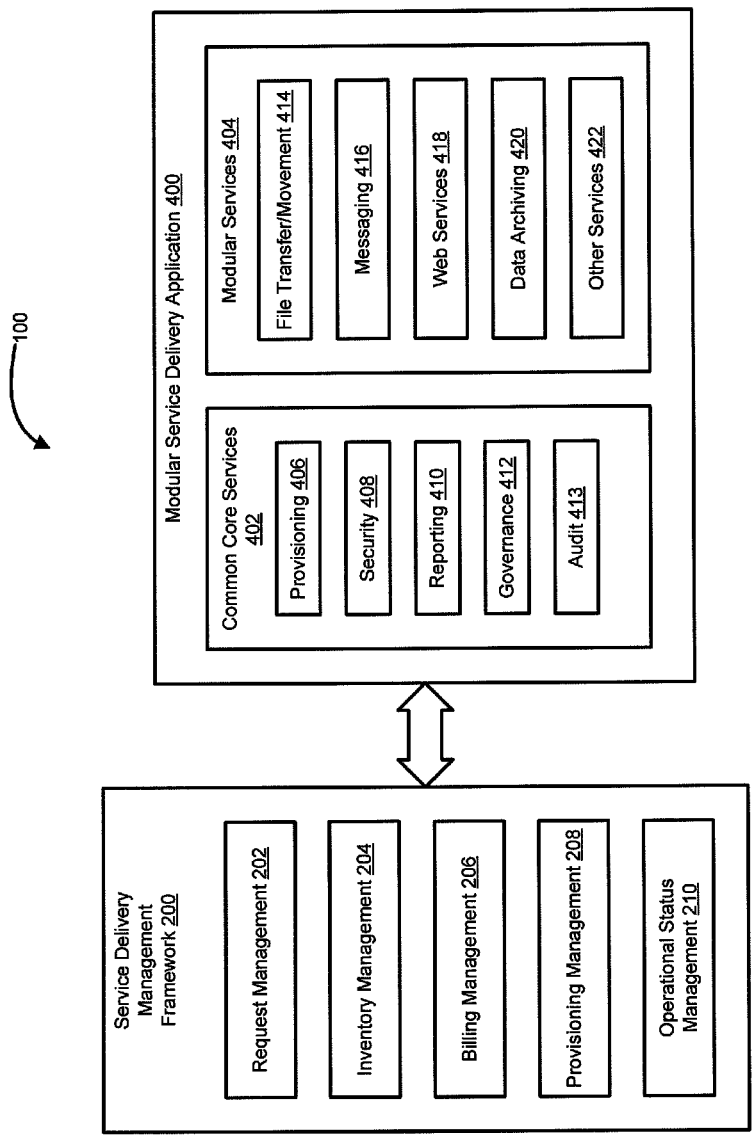
Figure 3:
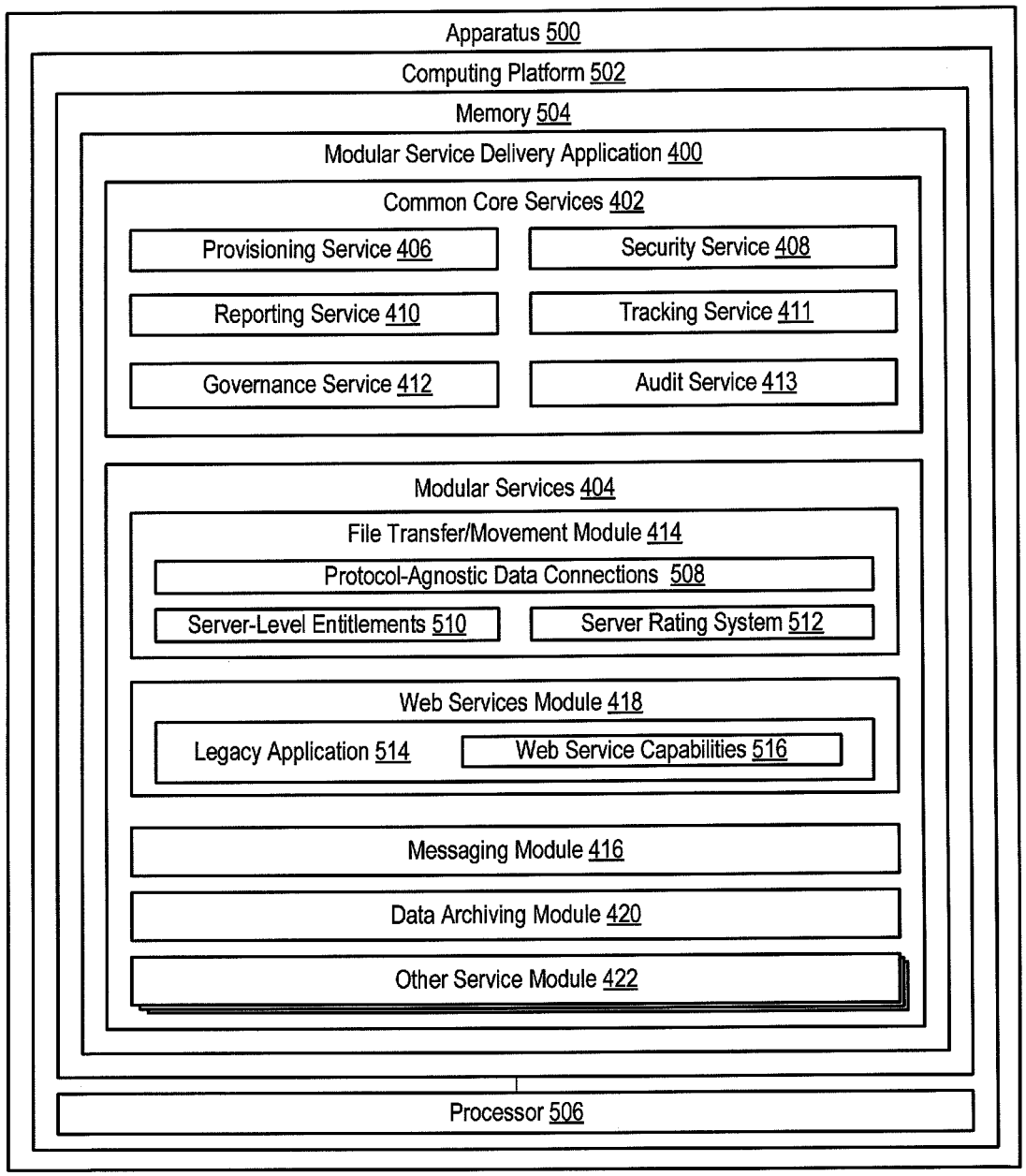

Having thus described embodiments of the invention in general terms, reference will now be made to the accompanying drawings, which are not necessarily drawn to scale, and wherein:

FIG. 1 provides a schematic diagram of a system for enterprise-wide service delivery including data movement/transfer and related management, in accordance with embodiments of the present invention;

FIG. 2 provides a block diagram of a system for enterprise-wide service delivery including data movement/transfer and related management, in accordance with embodiments of the present invention; and FIG. 3 provides a block diagram of the apparatus configured for an extensible module system including technology/OS-agnostic and protocol-agnostic data movement, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for a technology-agnostic and protocol-agnostic system for delivering services, including data movement/transfer within an enterprise. The embodiments herein described provide for a modular system that is easy and cost-effective to deploy and is extensible, such that as new services are warranted, additional modules can readily be added to the system. The technology/OS-agnostic nature of the system means that any server, regardless of manufacturer or OS, can be assimilated into the system for the purpose of providing the services including sending and/or receiving data. Moreover, the protocol-agnostic aspect of the system means that data can be transferred/communicated using any known, or future known, protocol (without requiring a separate application specific to the desired protocol). As such the present invention eliminates the need to utilize, maintain and configure compatibility amongst numerous OS-specific and/or protocol-specific applications for delivering such services, such as numerous data transfer applications and the like.

In addition, the system herein described provides for a comprehensive and unified approach to managing the services provided by the modular service delivery system. As such, the integrated system, in addition to providing the services, such as data movement transmissions/transactions, messaging, web services and the like also provides for unified governance control over the services, unified tracking of the services across the enterprise, unified auditing processes, granularity of control and the like. Such unified management control over the services eliminates the need to implement disparate security rules/processes, governance procedures, auditing practices and the like.

Referring to FIG. 1, a schematic diagram is provided of a system 100 for providing technology/OS-agnostic and protocol-agnostic delivery of services within an enterprise. The system 100 is configured as a hub-and-spoke model, in which the hub server 10 provides for management of the service delivery system via service delivery management framework 200 and the spoke servers 20, implemented throughout the enterprise, are deployed with a modular service delivery application 400. The service delivery application 400 is an open source based web services application and, as such, can be deployed and/or executed on any type of server (technology-agnostic) executing any type of operating system (OS-agnostic). The modular nature of the application means that the service delivery system is extensible; as additional services are added new modules within the application 400 may be added/plugged-in into the application 400. As such, the present invention provides a holistic approach to service delivery that results in an enterprise-wide solution for service delivery.

In specific embodiments of the invention, the service delivery application 400 includes a data movement/file transfer module (shown and described in FIGS. 2 and 3) that is configured to provide protocol-agnostic file transfer/transactions capabilities throughout the enterprise. Since the file transfer/data movement is configured as an open source application that is protocol-agnostic, deployment and use of data movement/file transfer module throughout most, if not all, of the enterprise's servers eliminates the need to deploy, maintain and configure compatibility amongst multiple different protocol-specific file transfer applications. In specific embodiments of the invention, the data movement/file transfer module relies on File Transfer Protocol Software (FTPS) that adds support for Transport Layer Security (TLS) and Secure Sockets Layer (SSL) encryption protocols.

Service delivery application 400 provides uniform management for all of the services delivered by service delivery application 400. In this regard, service delivery application 400 includes core services that act as a unifier to provide umbrella-like management over security, governance (approvals and exceptions), provisioning (new modules and revisions to modules), auditing, tracking, reporting and the like. Such uniformity in management provides efficiency and eliminates the need to resolve conflicts that arise in disparate applications having distinct security, governance, provisioning protocols, rules and regulations. For example, from a security perspective when individual protocol-specific data transfer applications are executed by an enterprise, each application will typically require a separate SSL (Secure Socket Layer) certificate to exist on each server; however, the present invention is configured such that only a single SSL certificate per server and the single SSL certificate can be used to authenticate all of the services delivered by the application 400. It should be noted that while the system only requires a single SSL certificate per server, the application 400 is configured to accommodate multiple SSL certificates if the application or a module within the application warrants such.

Referring to FIG. 2, a block diagram is presented of a system 100 configured for providing technology/OS-agnostic and protocol-agnostic delivery of services within an enterprise, in accordance with an embodiment of the present invention. The system 100 includes modular service delivery application 400 that includes common core services 402 and modular services 404. The core services 402 are common to all of the modular services 404 in the application and provide for unified umbrella-like management of the modular services. The core services may include, but are not necessarily limited to, provisioning 406, security 408, reporting 408 and governance/auditing 410.

The provisioning service 406 is configured to provide for uniform deployment of new modular services 404 and deployment of revisions/updates to existing modular services 404. In addition, provisioning service 406 is configured to provide hierarchical ordering of deployment based on criticality (i.e., server level), compliance and the like. Moreover, provisioning service 406 is configured to schedule deployment updates/revision and/or new modules so as to limit the impact of the deployment on production use of the server and/or other associated resources. Additionally, provisioning service 406 is configured to allow for non-compliant versions to be deployed with proper recordation/logging in place and for emerging or non-compliant versions to be declined.

The security service 408 provides uniform control over the security features applicable to the modular services 404. In this regard, the security service 408 provides uniform rules, regulations and procedures for security. For example, uniform rules related to authenticating a protocol/module, uniform rules associated with encryption, uniform rules for resolving a security conflict or the like.

The reporting service 410 provides uniform control over reporting functions associated with the modular services. For example, uniform control over what reporting is required, the contents of reports, parties receiving reports, actions that may result in alerts/notifications, parties receiving notification/alerts and the like.

The governance service 412 and audit service 413 provides uniform control over governance and auditing features applicable to the modular services. In this regard, the governance service 412 and audit service 413 provides uniform rules, regulations and procedures for rules exceptions, approval chains for granting exceptions, auditing procedures, auditing schedules and the like.

The modular services 404 provided by service delivery application 400 may include, but are not limited to, file transfer/movement module 414, messaging module 416, web services module 418, data archiving module 420 and any other service module 422.

File transfer/movement module 414 provides a unified open-source approach to moving data (e.g., file transfers, conducting transactions and the like) to and from devices (e.g., servers) deployed in the enterprise. The file transfer/data movement module 414 is configured to provide one consolidated methodology for accessing different operating systems and networked devices to move data to and from networked devices. As such, the file transfer/data movement module 414 provides a full-service, holistic approach that can be implemented enterprise-wide; obviating the need to deploy and maintain numerous disparate protocol and operating system-specific file transfer applications. In specific embodiments of the invention, the file transfer/movement module 414 is configured to provide a web-accessible view to manage file transfer/data movement, as well as track/monitor the movement of data within the enterprise in real-time or near real-time.

In specific embodiments of the invention, the file transfer/movement module 414 is configured to provide for data movement/file transfer at the device-level and/or at the application-level, such that data can be moved from one networked device to another, from one networked device to an application, or from one application to another application. In further specific embodiments of the invention, the file transfer/data movement module 414 relies on the request management 202 function of the service delivery management framework 200 to provide a requisite protocol for file transfer, thus, eliminating the need to locate and implement a secondary network device to perform protocol-agnostic data movement/file transfer. As a result complexity and overhead are significantly reduced.

Moreover, in additional embodiments of the invention, the file transfer/movement module 414 is configured to provide entitlements at the server-level or at the data-level, as opposed to granting entitlements at the user-level. In this regard, the file transfer/module 414 looks at whether movement of data is permissible from device-to-device and/or application-to-application. A user is granted access to the file transfer/movement module 414 and may be pre-configured to perform certain actions within the file transfer/movement module 414 (i.e., the user has access at the application/module-level and may be provided granular access to perform specific actions only). If two network devices and/or two applications are configured so to be entitled for data transfer (i.e., entitled for a data connection/file transfer) any module user, pre-configured to use the module and perform the requisite function, can request data movement/file transfer between the devices and/or applications. In this regard, unlike conventional, file transfer applications, the user is not required to have nor are they provided physical access to the devices from which data is communicated and/or received. As a result, the devices from which the data is communicated and received remain secure throughout the data movement/file transfer/transaction process, since the user does not have physical access to the devices and, therefore, does have access to other files/data stored on those devices (e.g., exploit vulnerabilities associated with having to log-on to the servers/devices).

In additional embodiments of the invention, the file transfer/movement module 414 is configured to implement a device/server rating system as a means of determining whether the devices are entitled for a data connection (e.g., whether the devices can exchange data/conduct transactions or the like). In specific embodiments of the invention, the rating system may be based on the type of data that a device is configured to send or receive (e.g., confidential data, proprietary data, public data and the like). In other specific embodiments of the invention, a secondary rating may be provided to account for the geographic location of the device within the enterprise (taking into account that certain geographic locations/countries may have rules/laws in place restricting the type of data that may be communicated/received within the countries geographic locale/boundaries).

Messaging module 416 provides a unified open-source approach to message brokering/queuing. The messaging module may comprise message-oriented middleware that supports sending and receiving messages between distributed systems. The messaging module allows application modules to be distributed over heterogeneous platforms and reduces the complexity of developing applications that span multiple operating systems and network protocols. The module 416 creates a distributed communications layer that insulates the module from specifics of operating systems and network interfaces. As such, the messaging module 414 provides a full-service, holistic approach that can be implemented enterprise-wide; obviating the need to deploy and maintain numerous disparate protocol and operating system-specific messaging applications.

Web services module 418 is configured to provide a unified open-source approach to enabling legacy applications that do not include web services with web services capabilities. In this regard, the web service module 418 communicates with the legacy application to create a web services interface and/or provide a web browser. The web services module 418 is configured to provide one consolidated methodology for accessing different operating systems and networked devices enable legacy applications with web services capabilities. As such, the web services module 418 provides a full-service, holistic approach that can be implemented enterprise-wide; obviating the need to deploy and maintain numerous disparate protocol and operating system-specific web services applications.

Data archiving module 420 is configured to provide a unified open-source approach to data archiving. The data archiving module 420 is configured to provide one consolidated methodology for accessing different operating systems and networked devices to archive data. As such, the data archiving module 420 provides a full-service, holistic approach that can be implemented enterprise-wide; obviating the need to deploy and maintain numerous disparate protocol and operating system-specific data archiving applications.

Additionally, service delivery application 404 may include other known or future-known service modules 422, which can be configured to provide a consolidated methodology for accessing operating systems and network devices to perform the desired service.

Service delivery management framework 200 is a web services framework which serves to integrate and connect the services provided by the service delivery application 400. Service delivery management framework 200 is extensible and may be configured, in specific embodiments to include, request management 202, inventory management 204, billing management 206, provisioning management 208 and operational status management 210. As previously discussed, request management 202 is configured to manage a request to deliver a service provided by service delivery application 400, include a request to move data/transfer a file or the like. Request management 202 may include configuring the service, verifying security and compliance, verifying/receiving requisite approval chain and the like. Billing management 206 is configured to automatically determine the volume of data being moved/transferred, apply a billing rate to the data being moved/transferred, determine a billing entity associated with the data and communicate billing data (e.g., invoice) to the billing entity. Provisioning management 208 is configured to work in unison with the provisioning service 406 in the common core services 402 of the delivery service application 400 to provide a unified approach to provisioning new modules and updates/revisions to existing modules. Such provisioning management includes determining deployment times and schedules and the like. Operational status management 210 includes providing a user interface that is configured to provide real-time access to tracking data and performance metrics, such as real-time tracking of data movement/file transfer within the enterprise.

Referring to FIG. 3 a block diagram is presented of the apparatus 500, which is configured for providing technology/OS-agnostic and protocol-agnostic delivery of services within an enterprise, in accordance with embodiments of the present invention. In addition to providing greater detail, FIG. 3 highlights various alternate embodiments of the invention. The apparatus 200 may include one or more of any type of computing device, such as a server or the like. The present apparatus and methods can accordingly be performed on any form of one or more computing devices.

The apparatus 500 includes computing platform 502 that can receive and execute algorithms, such as routines, and applications. Computing platform 502 includes memory 504, which may comprise volatile and non-volatile memory, such as read-only and/or random-access memory (RAM and ROM), EPROM, EEPROM, flash cards, or any memory common to computer platforms. Further, memory 504 may include one or more flash memory cells, or may be any secondary or tertiary storage device, such as magnetic media, optical media, tape, or soft or hard disk. Moreover, memory 504 may comprise cloud storage, such as provided by a cloud storage service and/or a cloud connection service.

Further, computing platform 502 also includes processor 506, which may be an application-specific integrated circuit ("ASIC"), or other chipset, processor, logic circuit, or other data processing device. Processor 506 or other processor such as ASIC may execute an application programming interface ("API") (not shown in FIG. 3) that interfaces with any resident programs, such as service delivery application 400 and routines, sub-modules associated therewith or the like stored in the memory 504 of the apparatus 500.

Processor 506 includes various processing subsystems (not shown in FIG. 3) embodied in hardware, firmware, software, and combinations thereof, that enable the functionality of apparatus 500 and the operability of the apparatus on a network. For example, processing subsystems allow for initiating and maintaining communications and exchanging data with other networked devices, such as hub server (10 of FIG. 1). For the disclosed aspects, processing subsystems of processor 506 may include any subsystem used in conjunction with service delivery application 400 and related algorithms, sub-algorithms, modules, sub-modules thereof.

Computer platform 502 may additionally include communications module (not shown in FIG. 3) embodied in hardware, firmware, software, and combinations thereof, that enables communications among the various components of the apparatus 500, as well as between the other networked devices. Thus, communication module may include the requisite hardware, firmware, software and/or combinations thereof for establishing and maintaining a network communication connection.

The memory 504 of apparatus 500 stores service delivery application 400 that is a modular-based, operating-system agnostic and protocol-agnostic means for providing services throughout an enterprise. In this regard, since the services that are provided are not tied to any one operating system or any one protocol, the service delivery application eliminates the need for the enterprise to execute and maintain a multitude of operating system-specific and protocol-specific service applications. As such, the service delivery application is instrumental in decreasing overhead costs associated with maintaining the multitude of diverse service applications. For example, the data transfer module 414 included in the service delivery application 400 eliminates the need for the enterprise to execute, maintain and ensure compatibility numerous different file transfer applications that may be specific to operating systems/hardware and operating using specific file transfer protocols.

In addition, the modular-based service delivery application 400 provides for comprehensive and unified management over the services delivered by the application 400. Such unified and comprehensive management of the services is accomplished by the common core services 402 included in the application 400. The common core services 402 are common to all of the modular services 404 in the application 400. The core services may include, but are not necessarily limited to, provisioning 406, security 408, reporting 408, governance 410, tracking 411 and auditing 412. These core services may be applied to any of the modular services to which the core service is applicable. The application may be configured such that a user has access to one or more user-interfaces/dashboards that allow for the user to manage and/or view the common core services. The user-interface/dashboard may be configured to be specific to a common core service (e.g., such that each common core service UI/dashboard provides access to and control over each of the modular services 404) and/or specific to a modular service (e.g., such that each modular service UI/dashboard provides access to and control over each of the common core services for the specified modular service).

The provisioning service 406 is configured to provide for uniform deployment of new modular services 404 and deployment of revisions/updates to existing modular services 404. The security service 408 is configured to provide uniform control over the security features applicable to the modular services 404. In this regard, the security service 408 provides uniform rules, regulations and procedures for security. For example, the security service 408 provides uniform rules related to authenticating a protocol/module, uniform rules associated with encryption, uniform rules for resolving a security conflict or the like. The reporting service 410 provides uniform control over reporting functions associated with the modular services. For example, the reporting service 410 provides uniform control over what reporting is required, the contents of reports, parties receiving reports, and the like.

The governance service 412 is configured to provide uniform control over governance including, but not limited to, rules, regulations and procedures for rule exceptions, approval chains for granting exceptions and the like. The tracking service 411 is configured to provide uniform control and management over tracking functions associated with the modular services; such as, but not limited, tracking file transfer/data movement throughout the enterprise. The auditing service 413 is configured to provide uniform control auditing requirements, such as, but not limited to, auditing procedures, auditing schedules and the like.

The modular services 404 provided by service delivery application 400 are dictated by the needs of the enterprise and, therefore, will vary from enterprise-to-enterprise. In addition, since the system is modular-based additional modules can be inserted into the application 400 on an as needed basis. In specific embodiments of the invention, the modular services 404 included in the application 400 include file transfer/movement module 414 that is configured to provides a unified open-source approach to moving data (e.g., file transfers, conducting transactions and the like) to and from devices (e.g., servers) and/or applications deployed in the enterprise. In this regard, the file transfer/movement module 414 is configured to establish protocol-agnostic data connections 508 between networked devices (e.g., services) or applications residing in networked devices and to initiate data movement, file transfers, transactions via the established data connections.

As previously noted, the file transfer/data movement module 414 is configured to provide one consolidated methodology for accessing different operating systems and networked devices to move data to and from networked devices. As such, the file transfer/data movement module 414 provides a full-service, holistic approach that can be implemented enterprise-wide; obviating the need to deploy and maintain numerous disparate protocol and operating system-specific file transfer applications.

Moreover, in additional embodiments of the invention, the file transfer/movement module 414 is configured to provide server-level entitlements 510, as opposed to granting entitlements at the user-level. In this regard, the file transfer/module 414 looks at whether movement of data is permissible from device-to-device and/or application-to-application. A user is granted access to the file transfer/movement module 414 and may be pre-configured to perform certain actions within the file transfer/movement module 414 (i.e., the user has access at the application/module-level and may be provided granular access to perform specific actions only). If two network devices and/or two applications are configured so to be entitled for data transfer (i.e., entitled for a data connection/file transfer) any module user, pre-configured to use the module and perform the requisite function, can request data movement/file transfer between the devices and/or applications. In this regard, unlike conventional, file transfer applications, the user is not required to have nor are they provided physical access to the devices from which data is communicated and/or received.

In additional embodiments of the invention, the file transfer/movement module 414 is configured to implement a device/server rating system 512 as a means of determining whether the devices are entitled for a data connection (e.g., whether the devices can exchange data/conduct transactions or the like). In specific embodiments of the invention, the rating system may be based on the type of data that a device is configured to send or receive (e.g., confidential data, proprietary data, public data and the like). In other specific embodiments of the invention, a secondary rating may be provided to account for the geographic location of the device within the enterprise (taking into account that certain geographic locations/countries may have rules/laws in place restricting the type of data that may be communicated/received within the countries geographic locale/boundaries).

In accordance with other embodiments of the invention, additional optional modular services 404 may include web services module 418, messaging module 416, data archiving module 420 and any other service module 422. Web services module 418 is configured to provide a unified open-source approach to enabling legacy applications that do not include web services with web services capabilities. In this regard, the web service module 418 communicates with the legacy application to create a web services interface and/or provide a web browser. The web services module 418 is configured to provide one consolidated methodology for accessing different operating systems and networked devices enable legacy applications with web services capabilities. Messaging Module 416 provides a unified open-source approach to message brokering/queuing. The messaging module 416 may comprise message-oriented middleware that supports sending and receiving messages between distributed systems. The messaging module allows application modules to be distributed over heterogeneous platforms and reduces the complexity of developing applications that span multiple operating systems and network protocols. The module 416 creates a distributed communications layer that insulates the module from specifics of operating systems and network interfaces. Data archiving module 420 is configured to provide a unified open-source approach to data archiving. The data archiving module 420 is configured to provide one consolidated methodology for accessing different operating systems and networked devices to archive data.

Thus, systems, apparatus, methods, and computer program products described above provide for a technology-agnostic and protocol-agnostic means for delivering services within an enterprise, including data movement. Thus, embodiments described above in detail serve to obviate the need to deploy numerous different technology/OS-specific and/or protocol-specific applications/services conventionally used to provide such services, such as moving/transferring data, conducting transactions or the like. The unified nature of the system not only provides for comprehensive delivery of services, such as data movement amongst all the servers in the enterprise's network but also provides for unified governance control over the services, unified tracking of services delivered, unified provisioning of updates/revisions to modules, auditing processes for services delivered, and the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for uniform delivery and management of services within an enterprise, the system comprising:
   a computing platform including:
      a memory device with computer-readable program code stored thereon;
      a communication device configured to establish operative communication with a plurality of server devices via communication network; and
      at least one processor in communication with the memory device and the communication device and configured to execute the computer-readable program code to:
         determine that a data connection is entitled between a plurality of the server devices based on a compatible rating of the servers, wherein the rating is based on a type of data that a server is authorized to transmit and receive and a geographic location of a server, wherein type of data includes one or more of confidential data, proprietary data and public data,
         determine that data transfer is entitled between a plurality of data file transfer applications running on the plurality of servers, wherein at least two of the plurality of data file applications deploy disparate protocols for conducting file transfers,
         in response to determining the data connection is entitled between the plurality of servers and the data transfer applications running on the plurality of servers, establish protocol-agnostic data connections between the plurality of servers for data transfer, and
         initiate, over the established data connections, transfer of data files between the plurality of data file transfer applications.

2. The system of claim 1, wherein the processor is further configured to execute the computer-readable program code to provide legacy applications with web services capabilities.

3. The system of claim 2, wherein the processor is further configured to execute the computer-readable program code to provide legacy applications with a web server.

4. The system of claim 1, wherein the processor is further configured to execute the computer-readable program code to provide message brokering.

5. The system of claim 1, wherein the processor is further configured to execute the computer-readable program code to provide data archiving.

6. The system of claim 1, wherein the processor is further configured to execute the computer-readable program code to present single Graphical User Interface (GUI) views configured to allow the user to manage security, governance, auditing, reporting and provisioning of the computer-readable program code.

7. The system of claim 1, wherein the processor is further configured to execute the computer-readable program code to provide a protocol for the data connections between the plurality of servers.

8. A computer program product comprising:
   a non-transitory computer-readable medium comprising:
      a first set of codes for causing a computer to:
         (i) determine that a data connection is entitled between a plurality of servers in an enterprise computing network based on a compatible rating of the servers, wherein the rating is based on a type of data that a server is authorized to transmit and receive and a geographic location of a server, wherein type of data includes one or more of confidential data, proprietary data and public data, (ii) determine that data transfer is entitled between a plurality of data file transfer applications running on the plurality of servers, wherein at least two of the plurality of data file applications deploy disparate protocols for conducting file transfers, (iii) in response to determining the data connection is entitled between the plurality of servers and the data transfer applications running on the plurality of servers, establish protocol-agnostic data connections between the plurality of servers for data transfer, and (iv) initiate, over the established data connections, transfer of data files between the plurality of data file transfer applications;

a second set of codes for causing the computer to provide message brokering;

a third set of codes for causing the computer to provide legacy applications with web services capabilities and a web browser; and a fourth set of codes for causing the computer to provide uniform management of security, governance, auditing, reporting and provisioning of the data connections, the message brokering and the web services capabilities.

9. The computer program product of claim 8, wherein the computer-readable medium further comprises a fifth set of codes for causing the computer to provide data archiving.

10. The computer program product of claim 8, wherein the fourth set of codes is further configured to provide uniform management of security, governance, auditing, reporting and provisioning of the modules included in the service delivery application by presenting single Graphical User Interface (GUI) views that allow the user to manage security, governance, auditing, reporting and provisioning of the modules.

\* \* \* \* \*